United States Patent [19]
Habasaki et al.

[11] Patent Number: 5,639,290
[45] Date of Patent: Jun. 17, 1997

[54] PROCESS FOR PRODUCING A GLASS PREFORM FOR AN OPTICAL FIBER AND APPARATUS FOR THE SAME

[75] Inventors: Toshimi Habasaki; Koji Takata; Fumitaka Uchino; Koji Amemiya; Yuji Takahashi, all of Yokohama, Japan

[73] Assignee: Sumitomo Electric Industries, Ltd., Osaka, Japan

[21] Appl. No.: 457,802

[22] Filed: Jun. 1, 1995

Related U.S. Application Data

[63] Continuation of Ser. No. 192,741, Feb. 7, 1994, abandoned.

[30] Foreign Application Priority Data

Feb. 10, 1993 [JP] Japan ......................... 5-22694

[51] Int. Cl.$^6$ ................................. C03B 37/018
[52] U.S. Cl. ...................... 65/377; 65/413; 65/532; 65/27
[58] Field of Search ..................... 65/532, 379, 413, 65/489, 377, 484, 27, 168

[56] References Cited

U.S. PATENT DOCUMENTS

| | | | |
|---|---|---|---|
| 4,280,829 | 7/1981 | Sheth | 65/417 |
| 4,421,540 | 12/1983 | Nakahara | 65/532 |
| 4,647,439 | 3/1987 | Lepetit | 423/121 |
| 4,740,226 | 4/1988 | Toda | 65/532 |
| 4,813,989 | 3/1989 | Uchiyama | 65/489 |
| 4,851,018 | 7/1989 | Lazzari | 55/356 |
| 5,127,929 | 7/1992 | Günther | 65/379 |

FOREIGN PATENT DOCUMENTS

| | | |
|---|---|---|
| 0546073 | 8/1985 | Australia . |
| 0178032 | 4/1986 | European Pat. Off. . |
| 56-037243 | 4/1981 | Japan . |
| 57-017439 | 1/1982 | Japan . |
| 59-128226 | 7/1984 | Japan . |
| 60-041539 | 3/1985 | Japan . |
| 63-176326 | 7/1988 | Japan . |
| 0193435 | 4/1989 | Japan . |
| 2176776 | 1/1987 | United Kingdom . |

OTHER PUBLICATIONS

European Search Report, Jan. 25, 1995.

*Primary Examiner*—John Hoffmann
*Attorney, Agent, or Firm*—Cushman Darby & Cushman, IP Group of Pillsbury Madison & Sutro, L.L.P.

[57] ABSTRACT

The present invention relates to a process for producing a porous glass preform for an optical fiber and an apparatus for conducting such a process. According to the process, fine glass particles are produced by heating and reacting vaporous starting materials in a reaction vessel. The resulting fine glass particles are thereafter deposited to obtain the porous glass preform. An exhaust gas containing non-deposited fine glass particles is exhausted through an exhaust duct at a velocity above 15 m/sec. Preferably, pressure fluctuation in the reaction vessel is minimized by supplying air from outside of the reaction vessel to the exhaust duct. In accordance with the present invention, the exhaust duct is less likely to become obstructed by non-deposited fine glass particles. As a result, the preform can be produced without interruption over an extended period of time.

13 Claims, 3 Drawing Sheets

PROCESS FOR PRODUCING A GLASS PREFORM FOR AN OPTICAL FIBER AND APPARATUS FOR THE SAME

This a continuation of application Ser. No. 08/192,741 filed on Feb. 7, 1994, now abandoned.

BACKGROUND OF THE INVENTION

1. Field of the Invention

The present invention relates to a process for the production of a glass preform for an optical fiber and an apparatus for carrying out such a process. Particularly, the present invention relates to a process for the production of a porous glass preform in which non-deposited fine glass particles are prevented from depositing in to the inside of an exhaust duct and/or residing within the exhaust duct when the glass preform is produced by deposition of fine glass particles: The present invention also relates to an apparatus for such a process.

2. Description of the Related Art

Processes using vapor phase reaction for producing a glass preform for an optical fiber have been known. As examples of such a process, the inside chemical vapor deposition (CVD) process, the outside chemical vapor deposition process and the vapor phase axial deposition process are known. In these processes, a vaporous starting material for glass flows out through an oxyhydrogen burner nozzle and a flame hydrolysis reaction occurs there, whereby fine glass particles produced from the reaction are deposited in the form of a rod to obtain the porous glass preform for the optical fiber in a reaction vessel.

FIG. 2 schematically shows a prior art system for the production of the glass preform for the optical fiber. In such a system, the fine glass particles are produced from combustion of a starting material gas of glass such as $SiCL_4$ gas, hydrogen gas and oxygen gas. The starting material gas flows out of the burner 2 in the reaction vessel 1, and the particles are deposited on the seed rod 4 as the porous glass preform 3. The seed rod 4 is grasped and rotated and also lifted by the chuck means 5 as the fine glass particles are deposited thereon.

In the above-described process, reactions occur according to the following reaction formulas in the reaction vessel in the case in which $SiCl_4$ is used as the starting gas material of glass:

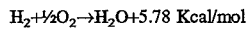

$$H_2 + \tfrac{1}{2}O_2 \rightarrow H_2O + 5.78 \text{ Kcal/mol}$$

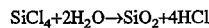

$$SiCl_4 + 2H_2O \rightarrow SiO_2 + 4HCl$$

As seen from the above formulas, heat of formation is generated due to the reaction of hydrogen and oxygen together with formation of $SiO_2$ fine particles.

Usually, about 50 to 90% by weight of the fine glass particles produced according to the above reactions ($SiO_2$ fine particles in this case) is deposited in the form of a column to produce the porous glass preform the balance, which is not deposited, is exhausted through an exhaust port 6 to the outside of the reaction vessel 1 by being entrained with an exhaust gas. Such fine glass particles which have not been deposited to form the preform in the reaction vessel will be, hereinafter, referred to as "non-deposited (fine) glass particles". The exhaust gas comprises, in addition to the non-deposited fine glass particles, the product gas materials (such as $H_2O$, $SiO_2$ and HCl), and also comprises ambient air around the reaction vessel which comes from the suction port of the reaction vessel. The exhaust gas containing the non-deposited glass particles reaches the fine glass particle scrubber 9 through a connection pipe 7 and an exhaust duct 8, and the gas is separated from the fine glass particles in the scrubber 9. Then, the exhaust gas, which is free from the glass particles, is withdrawn from the system through the acid gas treatment facility 10 to the ambient atmosphere (usually to the outside of a clean room in which the reaction vessel 1 is placed). It should be noted that some fine glass particles remain in the reaction vessel 1 and attach to the inside surface of the reaction vessel; however, a ratio of such particles to the formed particles is very small.

As to the heat of formation due to the reaction of oxygen and hydrogen, usually about 60 to 90% thereof is exhausted with the exhausted gas so that the exhaust gas is heated to an elevated temperature.

It is well-known that the apparatus for the production of the glass preform for the optical fiber is placed in a clean room which is pressurized positively so as to maintain the cleanness in the room. In order to also maintain the positive pressure in the clean room, an amount of air exhausted from the clean room should be limited. Thus, generally THE apparatus for producing the glass preform for the optical fiber is arranged to minimize the amount of the exhaust gas which is withdrawn from the reaction vessel because the exhaust gas comprises the ambient air of the reaction vessel and is drawn out to the outside of the clean room. Since, for such a purpose of minimizing the amount of the exhaust gas, an exhaust gas speed through the exhaust duct is as low as about 7±3 m/sec., fine glass particles which have not been deposited on the rod (i.e. the non-deposited fine glass particles) are very likely to deposit on the inside surface of the duct, thereby partially or completely blocking the duct. Due to the possibility of duct blockage, operation of the apparatus for the production of the glass preform for the optical fiber, hitherto, has to be stopped once per every two or three months so that the inside of the duct can be cleaned. Therefore, the productivity of the glass preform is reduced. Also, the blockage tendency of the duct makes an operation pressure in the reaction vessel unstable so that stable production becomes impossible. In addition, materials of which duct is formed are heated to an elevated temperature due to the heat of formation of the reaction between hydrogen and oxygen, and normal materials for the duct cannot withstand such an elevated temperature. Therefore, the duct should be made of special materials which are generally expensive, such as a heat resisting glass, Teflon and a high grade metal (for example, pure nickel, a nickel based alloy and so on).

SUMMARY OF THE INVENTION

It is an object of the present invention to provide a process for the production of a glass preform for an optical fiber which overcomes the above-described problems.

According to the present invention, there is provided a process for the production of a porous glass preform for an optical fiber in which fine glass particles are produced by heating and reacting vaporous starting materials for glass in a reaction vessel. The resulting fine glass particles are deposited to obtain the porous glass preform. The process is characterized in that an exhaust gas speed through an exhaust duct which exhausts an exhaust gas containing non-deposited fine glass particles from the reaction vessel is controlled to be above 15 m/sec.

In the present invention, it is preferable that air available from the outside of the reaction vessel is supplied to the exhaust gas leaving the reaction vessel at a position of the exhaust duct immediately downstream of the reaction vessel so that the above specified exhaust gas speed is achieved.

In the present invention, it is preferably that pressure fluctuation in the reaction vessel is minimized by supplying air from the outside of the reaction vessel to the exhaust duct through which the exhaust gas containing the non-deposited fine glass particles is exhausted from the reaction vessel.

The present invention also provides an apparatus for the production of a porous glass preform for an optical fiber comprising a reaction vessel in which starting materials for glass are reacted to produce fine glass particles which are deposited as the porous glass perform. The apparatus further comprises a means which supplies ambient air from the outside of the reaction vessel or from the outside of a room in which the reaction vessel is located to an exhaust duct through which an exhaust gas containing non-deposited fine glass particles is withdrawn from the reaction vessel.

DETAILED DESCRIPTION OF THE INVENTION

Figure 1:
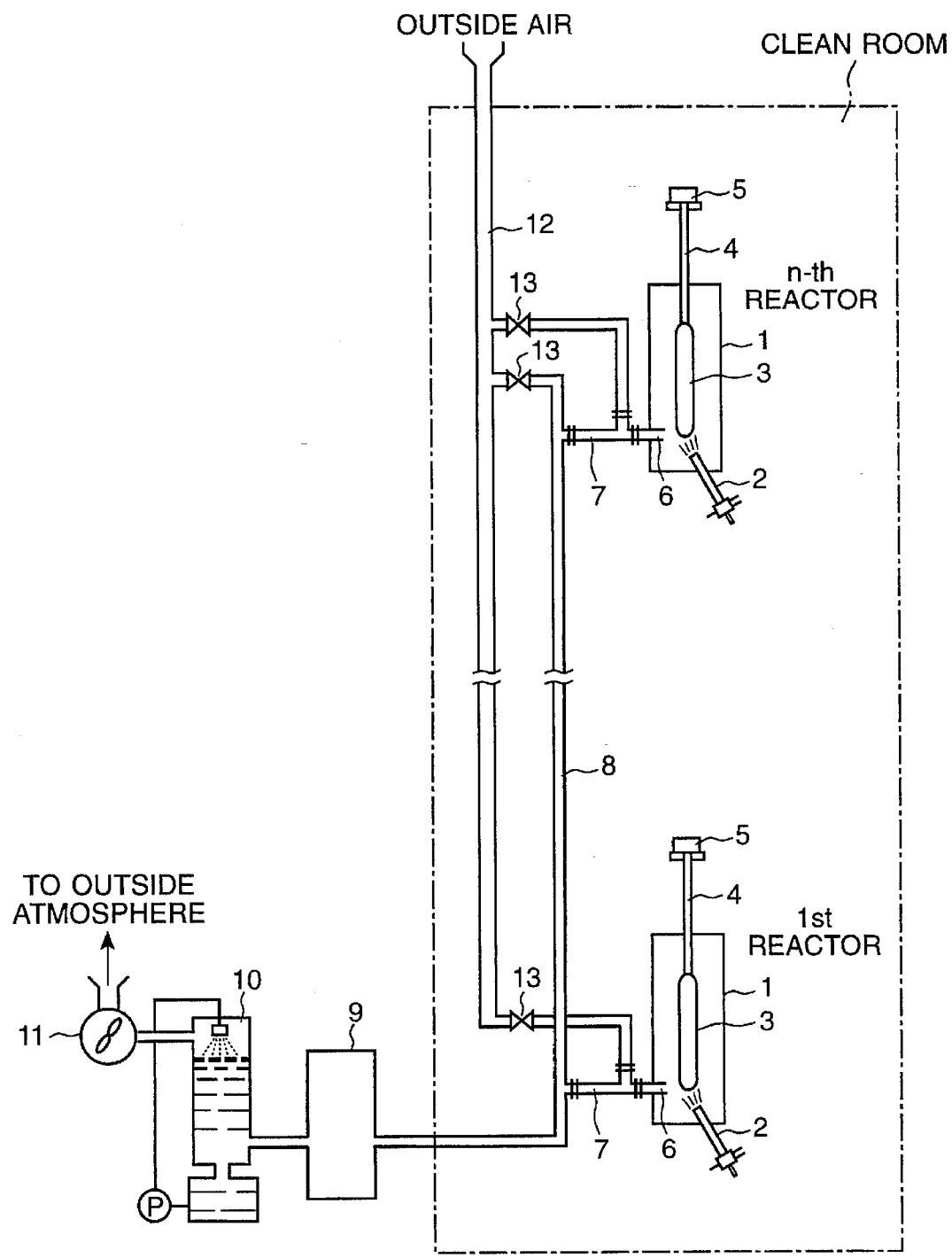
FIG. 1 schematically shows a system for the production of the porous glass preform for the optical fiber which comprises one embodiment of the apparatus according to the present invention.

Hitherto, it has been said that it is very difficult to prevent deposition of the non-deposited fine glass particles within the exhaust duct through which the exhaust gas containing the non-deposited fine glass particles is withdrawn to the outside of the reaction vessel. However, the present inventors have found that the deposition and/or the residence in the exhaust duct of the fine glass particles which are entrained in the exhaust gas can be prevented so that the exhaust duct is not likely to be blocked by controlling the exhaust gas speed through the exhaust duct to be above 15 m/sec. and preferably above 20 m/sec.

As described above, the exhaust gas speed through the exhaust duct has been 7±3 m/sec. in the prior art process since the clean room in which the reaction vessel is placed should be kept positively pressurized and thus the exhaust gas from the reaction vessel should be minimized.

In the present invention, a large amount of air may be supplied to the exhaust duct in order to increase the exhaust gas speed. In the prior art process, the air is supplied through the suction port of the reaction vessel, and then exhausted from the reaction vessel. By contrast, according to the present invention the exhaust gas speed preferably is not increased by intentionally supplying air from the clean room to the exhaust duct. Instead, the supplied air is preferably available from the outside of the reaction vessel (i.e. ambient air around the reaction vessel) or from the outside of the clean room. The latter is more preferable because there is substantially no effect on the positive pressure in the clean room even when a large amount of the air is supplied to the exhaust duct. In the present invention, the air is supplied directly to a connection pipe which is located just downstream of the reaction vessel, whereby the positive pressure in the clean room is ensured while the exhaust gas speed is increased to above 15 m/sec. As a result, the exhaust duct can be easily prevented over an extended period. According to the present invention, the operating pressure in the reaction vessel becomes stable so that the productivity of the glass preform for the optical fiber is greatly improved.

There is no specific upper limit of the exhaust gas speed within the exhaust duct. However, when the speed is excessively higher, apparatuses required to treat the exhaust gas would be larger in their scales and thus their costs would be increased. From these considerations, the upper limit of the exhaust gas speed may be practically determined. The speed of the exhaust gas through the duct is more preferably above 20 m/sec. Most preferably, the gas speed is above 20 m/sec. on the average. This is because the exhaust gas speed of at least 15 m/sec. is almost always ensured even though the speed is sometimes lowered to below 20 m/sec. temporarily.

In addition, the exhaust gas which exits the reaction vessel at an elevated temperature is diluted and thus its temperature is reduced by supplying a large amount of the outside air to the exhaust duct. Thus, the duct may be made of a normal duct material such as a heat resisting polyvinyl chloride resin or a fiber reinforced plastic (FRP) so that costs of the exhaust duct and its following apparatuses are reduced.

DESCRIPTION OF THE PREFERRED EMBODIMENTS

The apparatus for producing of the glass preform for the optical fiber according to the present invention will be, hereinafter, explained in detail with reference to the accompanying drawings.

Figure 2:
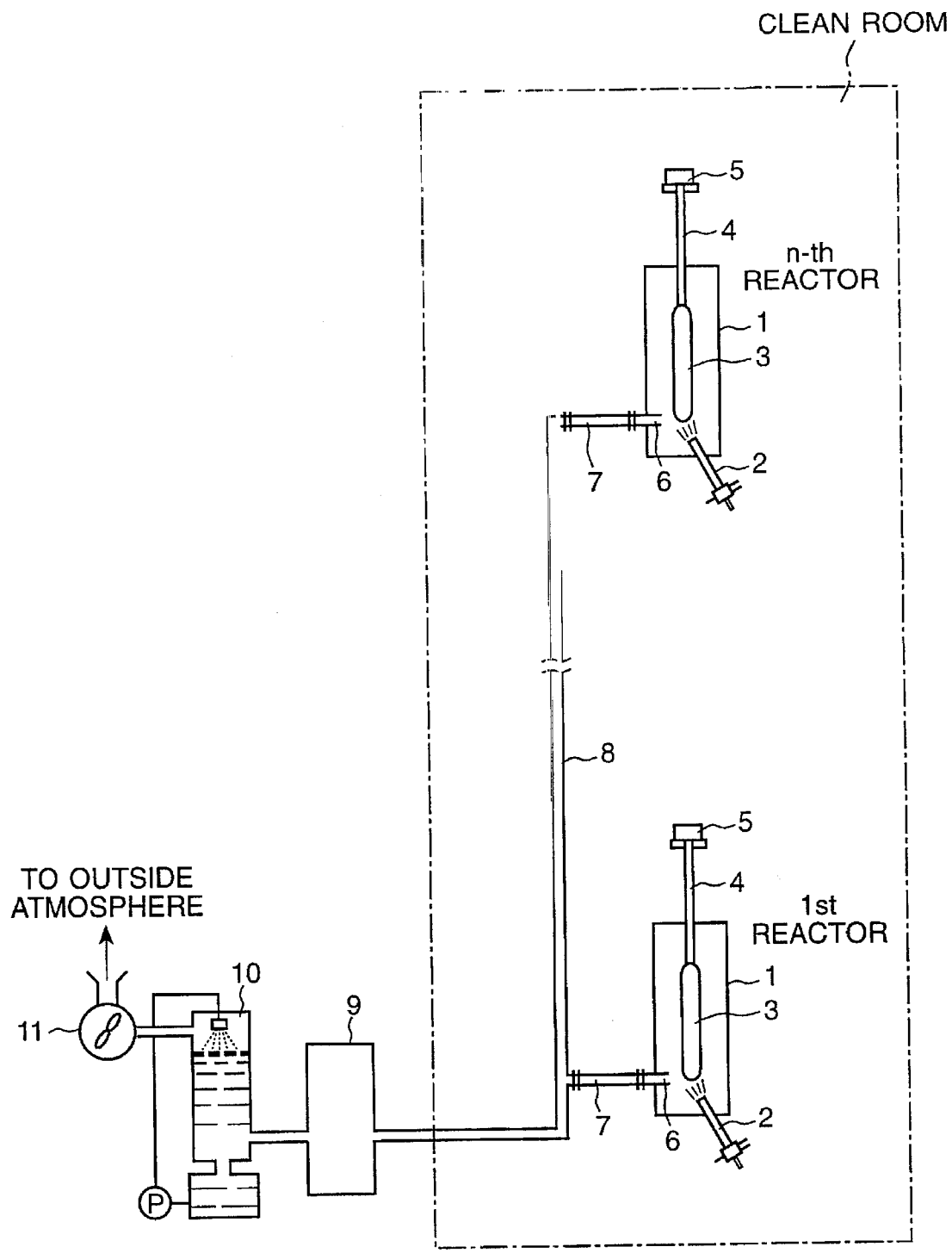
FIG. 2 schematically shows a system of the prior art for the production of the porous glass preform for the optical fiber.

FIG. 1 schematically shows one embodiment of the present invention in which the same or corresponding portions as in the conventional structure of FIG. 2 are designated by the same reference numerals as in numeral 1 indicates a reaction vessel, 2 a burner, 3 a porous glass preform, 4 a seed rod, 5 a chuck means, 6 an exhaust port, 7 a connection pipe, 8 an exhaust duct, 9 a scrubber for the fine glass particles, 10 an acid gas treatment facility, 11 an exhaust fan, 12 an outside air supplying conduit and 13 a valve which controls the introduction of the outside air. The alternate long and short dash line in FIG. 1 (and FIG. 2) indicates a clean room in which the reaction vessel 1 is placed. Although the number of the reaction vessels 1 in the clean room is not specially limited, in FIG. 1 (and FIG. 2), two reaction vessels (the first reaction vessel and the n-th reaction vessel) are shown. The reaction vessel 1 is provided with the exhaust port 6 through which the exhaust gas containing non-deposited fine glass particles is withdrawn from the reaction vessel 1. The exhaust gas containing the non-deposited particles is introduced through the connection pipe 7 to the exhaust duct 8. The outside air is supplied from the inside of the clean room or from the outside of the clean room to the connection pipe 7 through the outside air introducing tube 12 and the control valve 13 which controls the amount of the supplied outside air so as to keep the exhaust gas speed through the duct 8 above 15 m/sec., and preferably above 20 m/sec. on the average. The outside air can also be supplied directly to the exhaust duct 8, as illustrated in FIG. 1. Usually, a plurality of apparatuses for the production of the glass preform for optical fibers are placed in one clean room as described above, and the exhaust gas is exhausted from each reaction vessel 1 to the duct 8. The exhaust gas is gathered through the duct 8 into the fine glass particle scrubber 9 where the non-deposited fine glass particles are removed. The exhausted gas is then treated in the acid gas treatment facility 10 so that HCl gas contained therein is removed from the exhaust gas (mostly air), which is now harmless and which is exhausted to the ambient air by means of the exhaust fan 11.

As the scrubber 9 of the non-deposited fine glass particles, for example, an electrostatic precipitator or a Venturi scrubber may be used. In the acid gas treatment facility 10, it is conventional to shower a sodium hydroxide aqueous solution for neutralization of HCl.

EXAMPLE

Although the present invention will be further described with reference to the following example, the present invention is not limited to this example.

Example 1

Using the reaction vessel system as shown in FIG. 1 according to the present invention, the porous glass preforms for the optical fiber were produced. In this example, an amount of the exhaust gas from each reaction vessel 1 was kept constant for the stable production operation of the preforms while the exhaust gas speed through the duct 8 was controlled above 15 m/sec. on the average by using the outside air control valves 13. The production of the glass preforms was continued over more than eighteen months, and no blockage due to the non-deposited glass particles occurred. In addition, there was no need to clean of the duct during the continued production, so that the productivity of the preform was remarkably improved.

Compared with the prior art process in which the cleaning of the duct has been carried out at an interval of twice or three times per month, the effect of the present invention was confirmed in this example.

Figure 3:
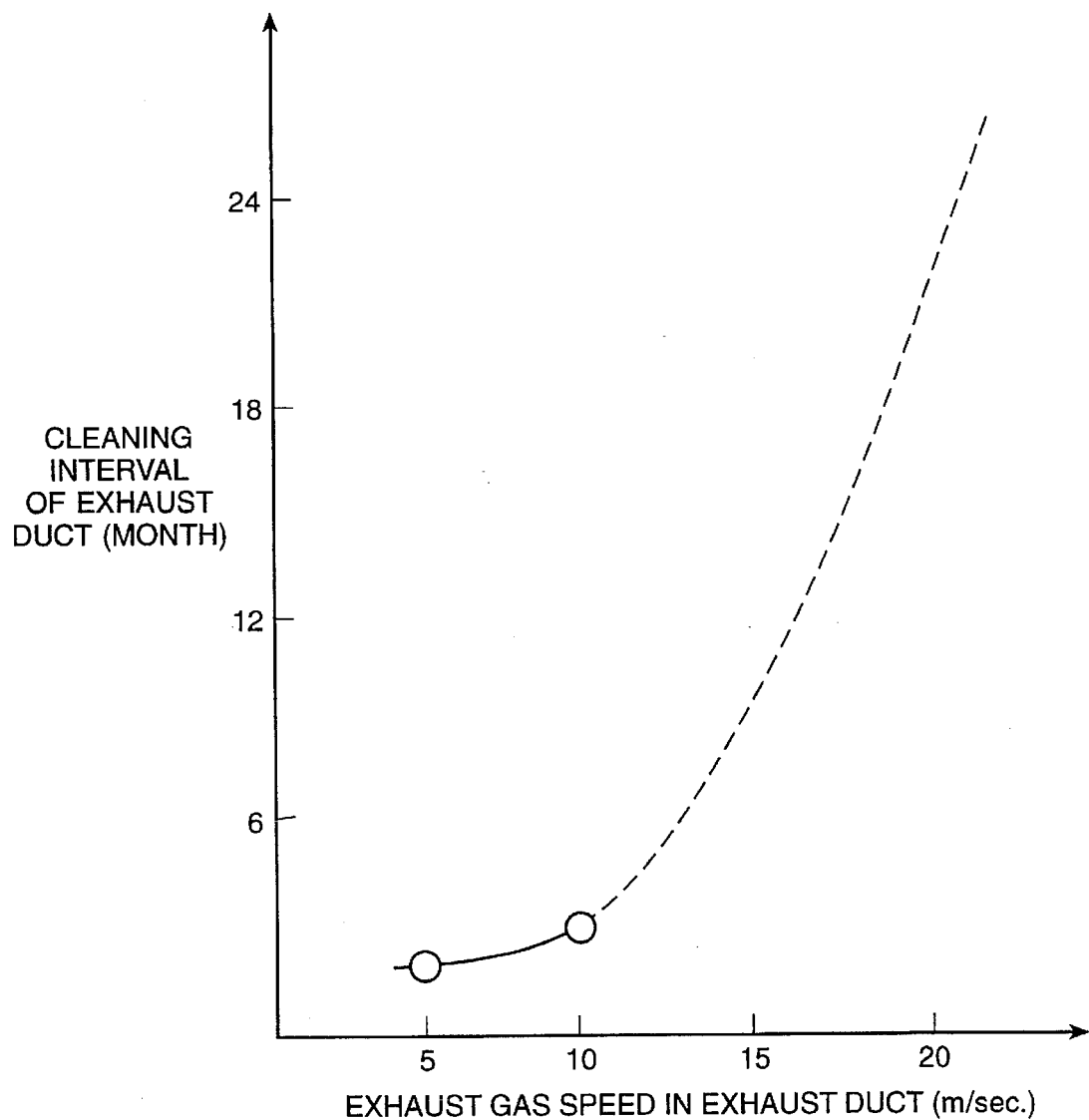
FIG. 3 shows a graph which indicates a relationship between a cleaning interval (month) and an exhaust gas speed (m/sec.).

FIG. 3 shows a graph indicating a relationship between the exhaust gas speed and the interval between the successive cleanings of the duct.

On the basis of data of average amounts of a hydrogen flow rate and an exhaust gas flow rate of Example 1, a temperature of the exhaust gas flowing through the duct 8 was obtained and shown in the following Table 1 together with the data of the prior art process. In Table 1, the duct materials which can be used in the processes are also shown.

TABLE 1

|  | Present Invention | Prior Art |
| --- | --- | --- |
| Hydrogen flow rate | 80 liter/min. | 80 liter/min. |
| Exhaust gas flow rate | 10 m³/hr | 3 m³/hr |
| Exhaust gas temperature in duct | 80° C. | 210° C. |
| Duct material | Heat resisting polyvinyl chloride FRP | Glass Teflon High grade metal |

It is seen from the above Table 1 that, in the present invention, the exhaust gas temperature in the exhaust duct is considerably lower and the exhaust duct can be, therefore, made of cheap materials such as the heat resisting polyvinyl chloride and FRP. In the prior art, PYREX® glass is used for the exhaust duct.

As demonstrated by the above description and Example, the apparatus of the present invention differs from prior art devices insofar as in the present invention the exhaust gas speed is increased above 15 m/sec. by supplying outside air to the exhaust duct at a position immediately downstream of the reaction vessel. As a result, the cleanliness of the room in which the reaction vessel is located can be maintained. Moreover, the temperature of the exhaust can be reduced.

Finally, blockage of the duct due to non-deposited fine glass particles can be prevented so as to maintain a stable inner pressure of the reaction vessel for an extended period during the operation thereof. Accordingly, an improved productivity of the glass preform can be achieved.

What is claimed is:

1. A process for producing a porous glass preform for an optical fiber comprising the steps of:

heating and reacting vaporous starting materials in a reaction vessel to produce fine glass particles;

depositing said fine glass particles to form said porous glass preform;

removing an exhaust gas containing non-deposited fine glass particles from said reaction vessel; and passing the exhaust gas through an exhaust duct at an exhaust speed which is above 15 m/sec.

2. A process according to claim 1, further comprising the step of supplying air from outside of said reaction vessel to said exhaust duct.

3. A process as recited in claim 1, wherein said exhaust speed is controlled to have an average velocity of above 20 m/sec.

4. A process as recited in claim 1, wherein said exhaust duct is located immediately downstream from said reactor vessel.

5. A process as recited in claim 4, wherein said exhaust speed is controlled to have an average velocity of above 20 m/sec.

6. A process for producing a porous glass preform for an optical fiber comprising the steps of:

heating and reacting vaporous starting materials in a reaction vessel to produce fine glass particles;

depositing said fine glass particles on a tube to form said porous glass preform;

removing exhaust gas containing non-deposited fine glass particles from said reaction vessel through an exhaust duct thereof;

supplying an outside air stream and combining said outside air stream with said exhaust gas; and controlling said outside air stream such that after said combining step, said exhaust gas has a velocity of above 15 m/sec.

7. A process as recited in claim 6, wherein said outside air stream is controlled such that after said combining step, said exhaust gas has an average velocity of above 20 m/sec.

8. A process are recited in claim 7, wherein said controlling step reduces a pressure fluctuation of said reaction vessel during operation thereof.

9. A process recited in claim 7, wherein said outside air stream is supplied from outside a room in which said reaction vessel is located.

10. A process as recited in claim 7, wherein said exhaust duct is located immediately downstream from said reactor vessel.

11. A process as recited in claim 6, wherein said controlling step reduces a pressure fluctuation of said reaction vessel during operation thereof.

12. A process as recited in claim 6, wherein said outside air stream is supplied from outside a room in which said reaction vessel is located.

13. A process as recited in claim 6, wherein said exhaust duct is located immediately downstream from said reactor vessel.

* * * * *